April 14, 1959  J. W. ALUMBAUGH ET AL  2,881,812
SLIDING MATERIAL GUIDE FOR TABLE SAWS
Filed May 27, 1957

INVENTORS.
John W. Alumbaugh
Ernest W. Greenwood
BY
ATTORNEY.

2,881,812
SLIDING MATERIAL GUIDE FOR TABLE SAWS

John W. Alumbaugh and Ernest W. Greenwood, Carthage, Mo.

Application May 27, 1957, Serial No. 661,689

1 Claim. (Cl. 143—52)

This invention relates to the building arts and, more particularly, to an improved material holder especially adapted for use with conventional circular table saws or the like.

The most important object of this invention is to provide a material holder for table saws which is safer than previously known holders and which is adapted to facilitate cutting of elongated boards or the like at designated angles with less danger of the saw operator being injured by the cutting edge of the saw.

A further important object of this invention is to provide such a material holder which is adapted to be utilized on conventional circular table saws without any modification of the saw or table being necessary, and which has parts thereon for guiding the boards to be cut through the saw at specified angles.

A further important object of this invention is to provide a material holder of the class described which is composed of a pair of relatively flat, rectangular plates which are disposed in spaced relationship so as to present a saw-clearing slot therebetween and having upright means thereon serving the dual purpose of maintaining the plates in desired spaced relationship, and also providing material-receiving guide means for holding the material to be cut at a specified angle.

Also an important object of this invention is to provide a material holder for table saws wherein a pair of spaced material guiding heads are disposed on the uppermost surface of the holder in a position so as to hold the board at a specified angle with respect to the saw, and which are located so that the end of the material to be cut may be positioned against one of the heads to thereby facilitate the cutting operation and to assure accurate cutting of the material.

Also an important object of this invention is to provide a material holder as above described which is constructed of simple, easily fabricated components which may be offered for sale at a much lower cost than previous holders and which also is much safer to operate.

Figure 2:
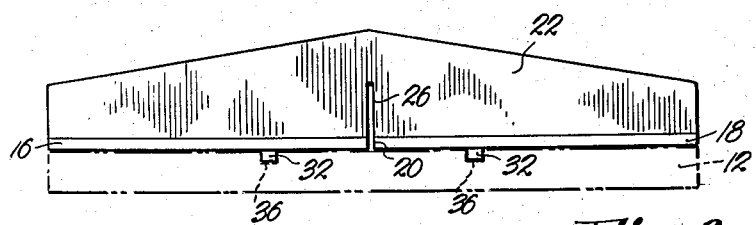
Fig. 2 is a front elevational view of the material holder illustrated in Fig. 1 and showing the same mounted on a saw table outlined in phantom.

A material holder designated broadly by the numeral 10 is illustrated in Fig. 2 as being slidably mounted on the uppermost face of a circular saw table 12 in a manner so as to be slidable across table 12 on a path of travel coincident with the line of cut of a circular saw blade (not shown) to facilitate cutting of material 14 such as boards or the like. Holder 10 preferably has a base 15 which is constructed of a pair of substantially flat, relatively thin, rectangular plates 16 and 18 which are disposed in spaced relationship so as to present a saw-clearing slot 20 therebetween. Although not necessary, it is preferable that a pair of elongated edges of plates 16 and 18 respectively be disposed in proximal relationship, and means for maintaining plates 16 and 18 in the specified spatial relationship may conveniently take the form of a pair of spaced guides 22 and 24 respectively.

Figure 1:
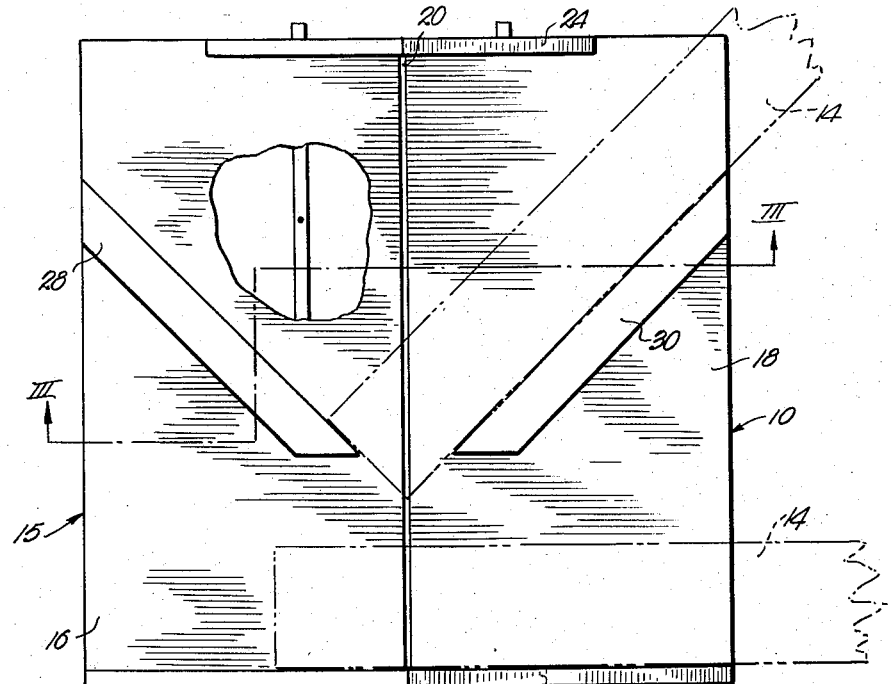
Figure 1 is a plan view of a material holder made in accordance with the concepts of the instant invention, certain parts being broken away to reveal details of construction and the material being shown in phantom to illustrate the manner in which the latter is held during the cutting operation.
Figure 3:
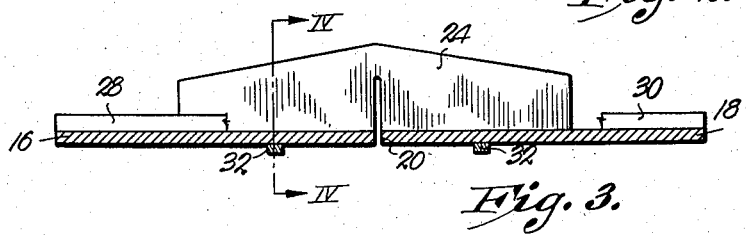
Fig. 3 is a rear elevation view of the instant invention.
Figure 4:
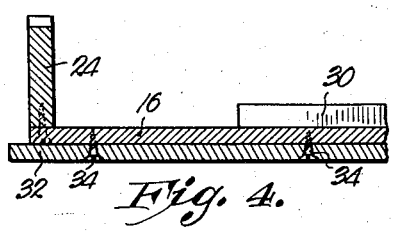
Fig. 4 is an enlarged, fragmentary, cross-sectional view taken on the line IV—IV of Fig. 3.

As illustrated in Figs. 1, 2 and 3, guide 24 is disposed at one end of base 15 while guide 22 is positioned at the other end thereof, each of the guides 22 and 24 extending upwardly from the uppermost face of base 15. Although the guides 22 and 24 are illustrated as being substantially trapezoidal in configuration, it is manifest that other polygonal shapes may also be utilized.

Each of the guides 22 and 24 is provided with a central, vertical notch 26 which is in alignment with slot 20 and of sufficient height and width to clear the saw blade as holder 10 is passed across table 12. Also of note is the fact that guide 24 is substantially shorter than guide 22 for reasons to be hereinafter outlined, although it is pointed out that it is preferred that the distances between the outermost ends of guide 24 and the outermost edges of base 15 be substantially equal.

Also provided on the uppermost face of base 15 are a pair of spaced guide heads 28 and 30 respectively, it being apparent that head 28 is secured to the uppermost face of plate 16 while head 30 is mounted on the upper face of plate 18. As illustrated in Fig. 1, the heads 28 and 30 are disposed at a designated angle with respect to slot 20, such angle, as illustrated, being approximately 45°. Manifestly, the angle at which heads 28 and 30 are disposed with respect to slot 20 may be varied at will, and it is contemplated that various methods may be provided for making heads 28 and 30 adjustable as desired, for example screws or threaded studs may be provided which pass through heads 28 and 30 and are receivable in a plurality of threaded openings in plates 16 and 18 respectively in predetermined positions, thereby making the angle of heads 28 and 30 with respect to slot 20 variable.

Also, it can be seen that the innermost ends of heads 28 and 30 lie in a common vertical plane which is substantially perpendicular to slot 20, and the innermost ends of heads 28 and 30 are located in close enough relationship that when a board 14 of commonly used size, such as 2" x 4", 2" x 6" or 2" x 8", is placed against one of the heads 28 or 30, the outermost end of the board contacts the other head 28 or 30. This is illustrated in Fig. 1 wherein it can be seen that board 14 is positioned against guide head 30 and the outermost end of board 14 engages head 28. The steadying influence produced by board 14 engaging both heads 28 and 30 will be explained more fully hereinafter.

Means for guiding holder 10 across table 12 in a substantially linear line conveniently takes the form of a pair of spaced, relatively narrow rails 32 secured to the lowermost face of base 15 by screws 34 or the like. It can be perceived that there is provided a rail 32 on each of the plates 16 and 18 respectively, and that rails 32 are disposed in substantial parallelism with slot 20. Also of importance is the fact that rails 32 are located substantially equidistantly from slot 20 and they are preferably spaced a sufficient distance so as to be receivable in elongated guide grooves 36 which are conventionally provided in the top of table 12. Thus, when rails 32 are slidably disposed in corresponding grooves 36, holder 10 is forced to describe a path across table 12 which is parallel with the line of cut of the saw blade.

The operation of material holder 12 is manifest from the above description, but it is to be pointed out that a cut perpendicular to one of the elongated edges of board 12 is effected by placing the board 14 against one of the guides 22 and 24 followed by passing the same through the saw, the saw blade passing through notches 26 and slot 20 as base 15 slides across table 12.

By the same token, board 14 is cut at a designated angle such as 45° or the like, by placing board 14 against one of the heads 28 or 30 and then moving the holder 10 across table 12. Greater safety is effected during the angular cutting operation by virtue of the fact that the outermost end of board 14 rests against head 28 and therefore, board 14 may be grasped a considerable distance from the saw blade during the cutting operation and preclude any possibility of the operator being injured by the saw blade. Also, accuracy of the angular cut is assured because of the fact that the outermost end of the board 14 engages head 28 and thus the saw blade engages board 14 at the corner where the end of board 14 meets one of the longitudinal edges thereof.

It can be seen that holder 10 is of simple, rugged construction which may be assembled at a minimum cost and the component parts thereof may be replaced as needed in a short period of time.

Having thus described the invention what is claimed as new and desired to be secured by Letters Patent is:

In a material handler for a circular table saw having guide grooves in the table thereof extending parallel to the saw blade, a base including a pair of substantially rectangular plates disposed with longitudinal edges thereof is opposed, spaced relationship sufficient to define a substantially linear slot therebetween of slightly larger dimensions than the width of the saw blade for clearing the latter, said base being adapted for slidable disposition on the uppermost face of the table; a pair of upright, elongated, spaced, relatively narrow material guides interconnecting corresponding ends of the plates, said guides being perpendicular to and bridging said slot, of sufficient length to substantially prevent relative movement of the plates and provide a bearing surface for material to be cut with the saw blade and having respective vertical notches therein in alignment with the slot and of sufficient height and width to clear the saw blade; and an elongated rail secured to the underface of the base for each of said guide grooves respectively, parallel with the slot and located a sufficient distance from the latter to assure passage of the saw blade through said slot and the notches when the base is moved across said table.

References Cited in the file of this patent

UNITED STATES PATENTS

| | | |
|---|---|---|
| 305,563 | Baer | Sept. 23, 1884 |
| 420,739 | Schmitz | Feb. 4, 1890 |
| 556,658 | Barnes | Mar. 17, 1896 |
| 812,574 | Linton | Feb. 13, 1906 |
| 913,078 | Weber | Feb. 23, 1909 |
| 1,872,388 | Bazzoni | Aug. 16, 1932 |
| 2,260,883 | Castle | Oct. 28, 1941 |